United States Patent Office 3,299,710
Patented Jan. 24, 1967

3,299,710
TEMPERATURE SENSING SYSTEM
Jude A. Pauli, Florissant, and Richard Willner, St. Louis, Mo., assignors to Alco Valve Company, St. Louis, Mo., a corporation of Missouri
Continuation of application Ser. No. 856,129, Nov. 30, 1959. This application Mar. 4, 1963, Ser. No. 263,382
6 Claims. (Cl. 73—368.2)

The present invention relates to a temperature sensing system and is a continuation of application for United States Letters Patent, Serial No. 856,129, filed November 30, 1959, now abandoned. The invention particularly contemplates a control system which may be connected into a work system, the work system being one in which the operating characteristics are in one way or another responsive to variations in temperature as measured at a particular location. Even more particularly does the invention involve a control system capable of generating a response to temperature variations at that particular location, regardless of temperature conditions elsewhere.

The invention employs a bulb and a chamber, with the two being connected by a fine-bore capillary tube. The entire system is closed. The bulb is the sensing element, and the chamber is the responsive element and has some means for reacting to variations at the bulb. That reacting means is, in turn, designed to transmit its reaction to the work system in such a way as to control the operation of the work system. The reacting means is described in the form of a pressure responsive diaphragm, although other forms are possible. Thus, the operation of the work system is controlled by the reaction of the reacting means, the reacting means by the pressure within the chamber, and the pressure within the chamber is dependent upon the temperature conditions at the bulb.

Temperature sensing systems employing the elements of the present invention have been in use heretofore. However, we are not aware of any such systems which respond to the temperature changes at the bulb only. To the contrary, these conventional sensing systems have been known to fail under conditions of cross-ambient temperatures. Cross-ambient temperature conditions are those in which the temperature of the control system is not uniform with that at the bulb. Inaccuracies of control have particularly occurred when the temperature at one or more points in the control system is lower than that at the bulb. Under such conditions, the reacting element in conventional sensing systems has reacted to the colder temperature rather than the bulb temperature. A principal object of the invention is to provide a temperature sensing system which avoids these inaccuracies and, instead, responds to the bulb temperature, regardless of temperatures elsewhere within the sensing system.

Various methods have been attempted to surmount this problem of cross-ambient conditions. One solution has been to design the bulb so that its internal volume is considerably greater that than of the rest of the system, and then filling the system so that at least half of its total volume is occupied by the volatile sensing medium in its liquid state, with the remainder of the volatile being in the saturated vapor state. Under such a design, when the temperature of the system drops below that of the bulb, the vapor in the system will condense. However, since there is sufficient liquid state to fill the entire system, exclusive of the bulb, the bulb will, nevertheless, contain the volatile in its vapor state. With the vapor always in the bulb, it will be the temperature at the bulb to which the diaphragm responds, regardless of the temperature of the system.

Another method of combatting the problems of cross-ambient conditions has been to provide an external heater to the system to assure its remaining always at a temperature above that of the bulb. Under this arrangement, called "gas charge" because of the small amount of liquid in the system, the diaphragm responds faithfully to the temperature at the bulb. It has certain advantages over the previously described "liquid" charge. First, the response time can be considerably shorter, and can be varied by changing the thermal mass and conductivity of the bulb. Second, the amount of volatile can be limited so that all of the liquid will be volatilized at some predetermined temperature, and any further rise in temperature will cause only a mild rise in pressure.

The present invention provides a new method of eliminating the problems of cross-ambient conditions in a refrigerant control system. It employs a theory of cross-charges applied to the system, and the invention is intended to incorporate both the product of the charge and the method of producing it. In its broadest sense, the invention includes the charging of the control system with both a condensable fluid and a non-condensable gas. It has been found that the control system, when so charged, responds faithfully to the temperature at the bulb rather than being influenced by temperatures in the system, even though they be below that at the bulb.

The system includes the same general elements as those used before: a bulb, a chamber (with a responsive element such as a diaphragm) and a capillary tube connecting them. The method of charging the system may be summarized as including a filling of the system with a volatile substance to a pressure equal to approximately two-thirds to three-fourths of the total pressure ultimately to be confined within the system. This pressure of the volatile may range in the neighborhood of 80 p.s.i.g. The system is then charged with the non-condensable gas. The partial pressure of the gas might, for example, be 25 p.s.i.g. making a total pressure within the system of 105 p.s.i.g.

This charging of the system is accomplished at a higher temperature than that to which it is proposed to operate the system. Therefore, when the temperature of the system is reduced to its normal operating temperature, there will be a small amount of condensing of the voltile occurring both in the bulb and in the chamber which controls the diaphragm.

When the system is in use, the temperature of the system will normally be about the same as or higher than that at the bulb. However, if the temperature of the system, including the chamber adjacent the diaphragm, drops below the temperature at the bulb, the non-condensable gas and the volatile will respond according to definite known laws. Thus, the gas will vary in pressure according to Charles' law while the partial pressure of the volatile will vary according to the relationship between its temperature and its saturated vapor pressure.

Experiment has shown that this arrangement of cross charges has resulted in a temperature sensing system which responds accurately to the variations of bulb temperature, and it is an object of the invention to provide such a control system. Specifically, it is an object of the invention to provide a temperature sensing system which is charged with a mixture of volatile, such as Freon, and a non-condensable gas, such as nitrogen.

An important feature of the present invention is the presence of a small amount of liquid phase volatile. In conventional bulb-type sensing systems, when the temperature of the system has dropped below that of the bulb, the liquid phase volatile has "pumped" from the bulb to the diaphragm controlling chamber. Thereafter, the increased difference in temperature between the bulb and the chamber has resulted in a decrease of pressure in the bulb with the resulting loss of control of the system. It is a particular object of the present invention to provide a temperature sensing system which does not lose its ability to maintain proper sensing of the temperature at the bulb caused by the pumping of the liquid phase volatile out of the bulb.

The system must be charged with the assurance that, when in use, it will consist of a volatile charge having a small amount of liquid phase in the bulb and chamber. A further object of the invention is to provide a method of charging such a system which assures the inclusion of a liquid phase volatile in the system.

Another object of the invention is to provide a method of charging a temperature-sensing system with both a non-condensable gas and a volatile fluid at a definite relationship between the densities of the two.

Further objects and advantages will be obvious to those skilled in the art.

Figure 1:
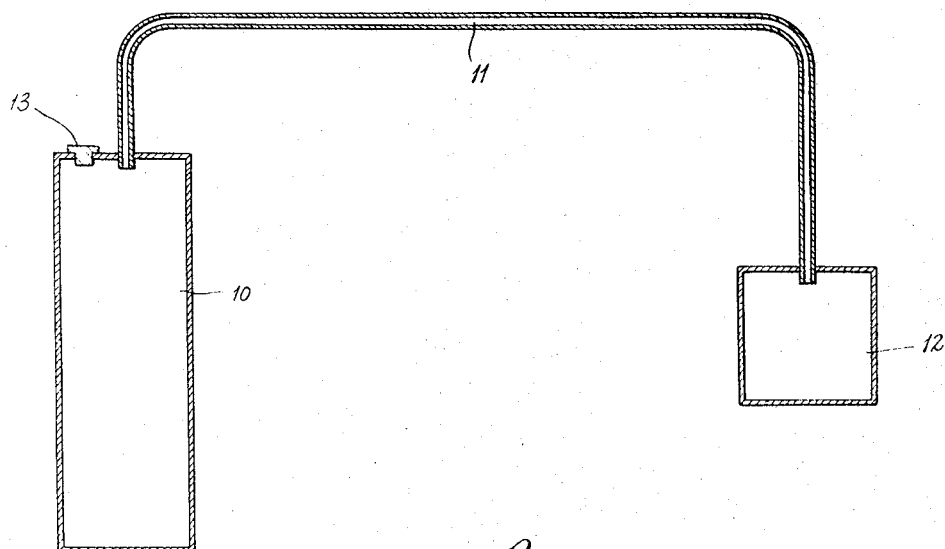
FIGURE 1 is a schematic illustration of the invention.

Referring to the drawing, FIGURE 1 illustrates diagrammatically the arrangement of elements into which the sensing medium is charged. It includes a sensing bulb 10 which is in the form of a closed container, the general design of which is conventional. In communication with the bulb 10 is a small bore capillary tube 11, and the capillary tube 11 connects the bulb 10 to a response chamber 12. The response chamber 12 is also in the form of a closed container, with its only opening being that providing access to the capillary tube, and, therefore, communication with the bulb 10. It should be here stated that the internal volume of the bulb is preferably larger than that of the chamber 12 and, for best results, the ratio may be in the neighborhood of three to one, or greater.

The bulb 10 may have an access plug 13 forming a fluid type seal with the bulb. In use, the plug 13 would not be removed, but it is included to permit the initial charging of the control system with the volatile and gas.

Examples of charges with which the sensing system will work are the following: Refrigerant 500 (Carene 7) and nitrogen; Freon 12 and nitrogen; and Genetron 152A and nitrogen. Other combinations are possible.

In charging the system, the plug 13 is removed, and into the resulting opening in the bulb 10 is connected a tube from a source of high pressure volatile, such as one of the Freon refrigerants. A pressure gauge is included with the tube to indicate the pressure of volatile pumped into the bulb 10. When an appropriate valve is opened, the bulb 10 (and, by means of the capillary tube 11, the chamber 12) is charged to a pressure within the system of approximately 80 p.s.i.g. With this pressure maintained within the system, the bulb 10 is then connected to a high pressure source of non-condensable gas such as nitrogen. The system is then additionally charged to total pressure of approximately 105 p.s.i.g., or partial pressure of 25 p.s.i.g. of nitrogen and 80 p.s.i.g. of Freon. The plug 13 is replaced while the pressure is maintained within the system. This charging of the system with the Freon and the nitrogen ordinarily may be accomplished at room temperature, since the system will usually be used at temperatures considerably below that. At room temperature, the Freon will be entirely in the vapor state. Then, when the system is placed in its lower temperature environment, some liquid Freon will form within both the bulb 10 and the chamber 12, the volume of liquid being very small compared to the volume of vapor. The vapor within both the bulb 10 and the chamber 12 will be saturated vapor.

Figure 2:
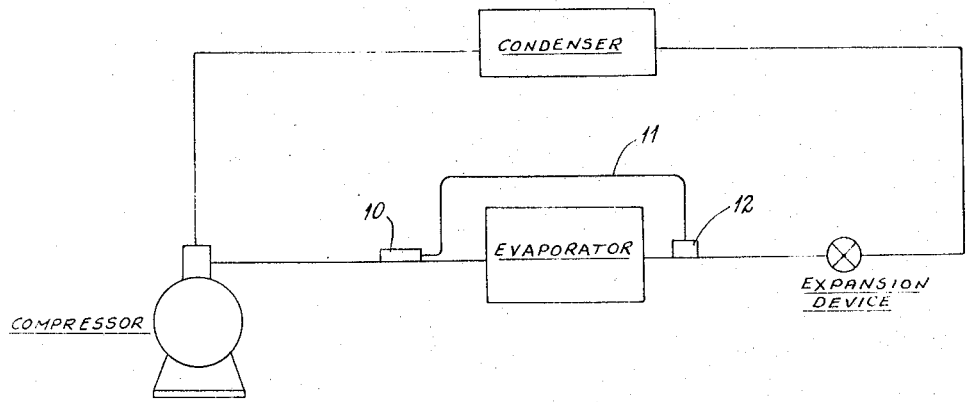
FIGURE 2 is a diagrammatic showing of the invention incorporated into a refrigeration system.

With the control connected into the refrigeration system illustrated in FIGURE 2, it has been found in practice that the diaphragm will respond faithfully to the temperature at the bulb 10. Although we do not intend to be bound by it, the following is an analysis of the theory of operation of the control.

If the temperature of any part of the system is changed, the pressure of the nitrogen will vary according to Charles' law. That is to say, it will vary in proportion to the absolute temperature of the gas. At the same time, the pressure of the Freon vapor will respond according to the relationship between the saturated vapor pressure and the temperature.

For example, it may be assumed that the temperature of the system, exclusive of the bulb but including the chamber 12, drops below the temperature at the bulb. In that case, there will be further condensing of the Freon in the chamber 12 with a resulting increase in liquid phase, and decrease in vapor phase, within the chamber 12. Because of the greater volume of equal weights of vapor phase compared to liquid phase Freon, the resulting condensation of the Freon will have a considerable effect in decreasing the volume, and, therefore, partial pressure of the Freon vapor within the chamber 12. If it be assumed that the temperature within the bulb 10 remains constant, there will be no change in the pressure within the bulb 10. Thus, a resulting pressure difference will exist between the bulb 10 and the chamber 12.

Further assuming that the nitrogen and Freon molecules are intermixed, the tendency of the system to equalize pressure between the bulb and chamber will result in a flow of Freon vapor and nitrogen gas from the bulb 10 through the capillary tube 11 to the chamber 12. This will reduce the pressure in the bulb 10 below the saturation pressure at the temperature of the bulb. As a result, there will be some boiling off of the liquid Freon in the bulb 10 to form additional vapor in that bulb. In similar fashion, the flow of Freon and nitrogen from the bulb 10 to the chamber 12 will increase the pressure in the chamber 12 above that pressure corresponding to the reducing pressure in the chamber 12. This will result in some further condensing of the Freon which has flowed into the chamber 12 as the result of its reduced temperature.

Had the system been charged only with the volatile Freon, as was conventional heretofore, the flow of Freon would have continued until all the liquid phase in the bulb 10 had volatilized. Accompanying would have been a flow of vapor into the chamber 12 until so much of the vapor within that chamber had condensed that the system reached the saturated vapor pressure corresponding to the vapor pressure at the chamber 12. The net effect would have been a loss of control of the system, with the diaphragm responding to the pressure at the chamber 12 rather than at the bulb 10.

The presence of the nitrogen gas alters this action of the system. It has been assumed that the flow from the bulb 10 to the chamber 12 is a mixture of Freon and nitrogen. As a result, the partial pressure of the nitrogen in the chamber 12 has become greater than that within the bulb 10. In other words, the difference in partial pressure of the nitrogen has opposed the difference in partial pressure of the Freon, the partial pressure of the latter being greater at the colder chamber than at the bulb, while the partial pressure of the former is greater at the bulb than at the chamber. Thus, the nitrogen will counteract the tendency of the Freon to continue to "pump" from the bulb 10 to the chamber 12 because the flow of the mixture will cease when the total pressure of the bulb 10 and the chamber 12 are equal; in other words, when the partial pressure difference of the nitrogen is equal and opposite to the partial pressure difference of the Freon vapor.

Remaining to be considered is the effect of the above action upon the total pressure within the system. It should be recalled that the initial assumption was that the temperature at the chamber 12 dropped below that of the bulb 10, while the temperature of the bulb 10 remained constant. If all the liquid phase Freon in the bulb 10 does not vaporize, the partial pressure of the Freon vapor in the bulb 10 will remain constant, as dictated by the temperature at the bulb 10. Therefore, the total pressure in the bulb 10 will be reduced by that amount which the partial pressure of the nitrogen within the bulb 10 is reduced.

If the chamber 12 and the bulb 10 have equal volumes, there will be an increase in the nitrogen pressure in the chamber 12, equivalent to the decrease in the bulb 10. However, if the bulb 10 has a larger volume than the chamber 12, there will be a greater pressure increase in nitrogen at the chamber than at the bulb in proportion to the ratio of bulb to chamber volume. For instance, if the volume of the bulb is three times that of the chamber 12, the increase in nitrogen pressure at the chamber 12 will be three times the decrease at the bulb 10, and the reduction in total pressure at the bulb will be only 25% of difference in the Freon saturated vapor pressures between the bulb 10 and the chamber 12.

One of the beneficial characteristics of the cross charge herein disclosed is the quick response time. Whereas a "gas" charge has a much faster response time than a "liquid" charge, the response time of the present cross charge very nearly approaches that of the gas charge.

As before stated, we do not intend to be limited by the foregoing analysis or explanation of the operation of the cross charge. However, the following derivation of equations offers support for the theory. For these derivations, the following nomenclature is used:

$P$ = absolute pressure (p.s.i.a.)
$T$ = absolute temperature (° R)
$V$ = volume (cubic inches)
$W$ = weight (pounds)

And the following subscripts:
1 = bulb
2 = chamber
R = condensable vapor (Freon)
N = non-condensable gas (nitrogen)
0 = initial homogeneous charge condition (1) For conservation of mass of the non-condensable gas:

$$W_{N1} + W_{N2} = W_{N10} + W_{N20} \tag{1}$$

$$\frac{P_{N1}V_1}{RT_1} + \frac{P_{N2}V_2}{RT_2} = \frac{P_{N0}V_1}{RT_0} + \frac{P_{N0}V_2}{RT_0}$$

$$P_{N2} = P_{N0}\frac{T_2}{T_0}\frac{V_1}{V_2} + P_{N0}\frac{T_2}{T_0} - P_{N1}\frac{T_2}{T_1}\frac{V_1}{V_2} \tag{2}$$

(2) For an equalized system:

$$P_1 = P_2 \tag{3}$$
$$P_{N1} + P_{R1} = P_{N2} + P_{R2}$$
$$P_{N1} = P_{N2} + P_{R2} - P_{R1} \tag{4}$$

(3) Combining Equations 2 and 4

$$P_{N1} = P_{N0}\frac{T_2}{T_0}\frac{V_1}{V_2} + P_{N0}\frac{T_2}{T_0} - P_{N1}\frac{T_2}{T_1} \times \frac{V_1}{V_2} + (P_{R2} - P_{R1}) \tag{5}$$

$$P_{N1} = \frac{P_{N0}\frac{T_2}{T_0}\frac{V_1}{V_2} + P_{N0}\frac{T_2}{T_0} + (P_{R2} - P_{R1})}{1 + \frac{T_2}{T_1}\frac{V_1}{V_2}}$$

$$= \frac{P_{N0}\frac{T_2}{T_0}\left(1 + \frac{V_1}{V_2}\right) + (P_{R2} - P_{R1})}{1 + \frac{T_2}{T_1}\frac{V_1}{V_2}}$$

(4) The total pressure will then be:

$$P_1 = P_{R1} + P_{N1} \tag{7}$$

$$= \frac{P_{R1} + P_{N0}\frac{T_2}{T_0}\left(1 + \frac{V_1}{V_2}\right) + (P_{R2} - P_{R1})}{1 + \frac{T_2}{T_1}\frac{V_1}{V_2}}$$

$$= \frac{P_{N0}\frac{T_2}{T_0}\left(1 + \frac{V_1}{V_2}\right) + P_{R2} + P_{R1}\frac{T_2}{T_1}\frac{V_1}{V_2}}{1 + \frac{T_2}{T_1}\frac{V_1}{V_2}} \tag{8}$$

(5) With the entire system at temperature $T_1$:

$$P_E = P_{R1} + P_{N1} = P_{R1} + P_{N0}\frac{T_1}{T_0} \tag{9}$$

(6) Then the shift of pressure due to cross-ambient temperature $T_2$ is:

$$P_S = P_1 - P_E = P_{N1} - P_{N0}\frac{T_1}{T_2} \tag{10}$$

$$= \frac{(P_{R2} - P_{R1}) + P_{N0}\frac{T_2}{T_0}\left(\frac{V_1}{V_2} + 1\right) - P_{N0}\frac{T_1}{T_0} - P_{N0}\frac{T_2}{T_0}\frac{V_1}{V_2}}{1 + \frac{V_1}{V_2}\frac{T_2}{T_1}}$$

$$= \frac{(P_{R2} - P_{R1}) + \frac{P_{N0}}{T_0}(T_2 - T_1)}{1 + \frac{V_1}{V_2}\frac{T_2}{T_1}} \tag{11}$$

A close approximation for the apparent temperature shift caused by cross-ambient conditions is as follows, noting that T equals $T_2 - T_1$, $dP$ is the rate of change of pressure, $dT$ is the rate of change of temperature, and that the pressure-temperature curve for an inert gas on an absolute temperature graph is substantially a straight line so that the ratio of pressure to temperature at any point on the curve or of change in pressure to change in temperature between any points on the curve is substantially constant.

(7) Equation 11 can be rearranged:

$$P_S = \frac{(T_2 - T_1)\left[\frac{P_{R2} - P_{R1}}{T_2 - T_1} + \frac{P_{N0}}{T_0}\right]}{1 + \frac{V_1}{V_2}\cdot\frac{T_2}{T_1}} =$$

$$1 + \frac{V_1}{V_2}\cdot\frac{T_2}{T_1}\frac{\Delta T\left[\frac{dP_{R1}}{dT_1} + \frac{dP_{N1}}{dT_1}\right]}{1 + \frac{V_1}{V_2} + \frac{V_1}{V_2}\cdot\frac{\Delta T}{T_1}} = \frac{\Delta T\left[\frac{dP_1}{dT_1}\right]}{1 + \frac{V_1}{V_2} + \frac{V_1}{V_2}\cdot\frac{\Delta T}{T_1}}$$

(8) The apparent temperature shift $T_S$ is:

$$T_P = \frac{P_S}{dP/dT} = \frac{\Delta T}{1 + \frac{V_1}{V_2} + \frac{V_1}{V_2}\frac{\Delta T}{T_1}}$$

For rational values of cross-ambient conditions the factor $$\frac{\Delta T}{T_1}$$

is much less than 1. Therefore, the following is approximately true:

$$T_S = \frac{\Delta T}{1 + \frac{V_1}{V_2}}$$

A particular advantage in the temperature sensing system of this invention is derived from its use to control a refrigeration cycle. The invention will, accordingly, be given special emphasis in that environment. It is to be understood, however, that the invention has much broader aspects than those limited to its use with a refrigeration cycle, that the description with the refrigeration cycle is illustrative only, and that the invention has utility wherever the control of a work cycle is to be effected by temperature variations.

A conventional refrigeration cycle employs a compressor, a condenser, an expansion device and an evaporator, all connected in series. It is common practice to control the flow rate of refrigerant through the evaporator according to the temperature of the refrigerant as it leaves the evaporator. However, in the prior art methods of control, there has been a loss of control, already referred to, under cross-ambient temperature conditions.

The present invention may be used to control a refrigeration cycle if it is connected into the cycle as schematically illustrated in FIGURE 2. Thus, the bulb 10 is located between the evaporator and the compressor for sensing the temperature of the suction gas, and the responsive chamber 12 is connected between the expansion device and the evaporator. The reacting means within the chamber 12, which may be in the form of a pressure-responsive diaphragm, is arranged to open and close an appropriate valve means to regulate the rate of flow of refrigerant through the evaporator.

In conventional sensing systems, under cross-ambient temperature conditions, errors occur because the volatile with which the sensing system is charged condenses at the colder points of the system, reducing the pressure there. The vapor then flows from the bulb toward the lower pressure area, reducing the pressure in the bulb below the saturated pressure corresponding to the temperature at the bulb. Consequently, the liquid in the bulb evaporates because of this lower pressure within the bulb. The flow of vapor from the bulb to the colder area, at which it continues to condense because of the lower saturation temperature, will continue until all the liquid is "pumped out" of the bulb. The diaphragm will then react to the lower system pressure corresponding to that at the colder points.

The present temperature sensing system effects control of the refrigeration cycle according to the temperature at the bulb, as has already been explained. Its use in a refrigeration cycle is thus a typical example of the tremendous advantages of the invention.

Various changes and modifications may be made within the purview of this invention as will be readily apparent to those skilled in the art. Such changes and modifications are within the scope and teaching of this invention as defined by the claims appended thereto.

What is claimed is:

1. A method of using a temperature sensing system which has a bulb and a chamber interconnected by tube means with the volume of the bulb being greater than that of the chamber and tube means combined, comprising the steps of charging the chamber, bulb and tube means with a mixture of condensable and non-condensable fluids, the maximum volume of liquid phase of the charge being less than the combined volumes of the chamber and tube means, locating the bulb in a position sensitive to temperature changes in a critical area, but where temperatures at times are higher than those at the chamber or tube means, sensing changes in the fluid pressure within the bulb caused by variations in pressure exerted by the condensable fluid proportioned to temperature changes in the critical area, producing a useful reaction in the chamber to the sensed changes, the non-condensable fluid being of sufficient quantity to maintain a quantity of the condensable fluid within the bulb when the temperature at the chamber is below that at the bulb.

2. The method of claim 1 wherein the condensable fluid is a volatile substance and the non-condensable fluid is a gas.

3. A method of using a bulb and a chamber interconnected by tube means, the combination being of the type adapted to be connected into a refrigeration system for controlling the flow rate of refrigerant through the system; said bulb and chamber being charged with a mixture of non-condensable and condensable fluids; the maximum of liquid phase of the charge being less than the combined volumes of the chamber and tube means; the volume of the bulb being greater than that of the chamber and tube means combined; the partial pressure of the non-condensable being less than that of the condensable fluid, the method comprising the steps of locating the bulb at a place where temperature variations are to be sensed, locating the chamber at a place different from that of the bulb and where the chamber can respond to temperature variations sensed by the bulb and control the rate of flow of refrigerant through the system, the place where the chamber is located having potential temperatures lower than the simultaneous temperatures at the bulb.

4. The method of claim 3 wherein the non-condensable fluid is nitrogen and the condensable fluid is a refrigerant.

5. In a temperature sensing system including a bulb interconnected by a tube with a chamber having pressure responsive means in the chamber, the method of sizing the bulb, tube, and chamber so that the volume of the bulb is greater than the combined volumes of the tube and chamber, locating the bulb and chamber at places where sometimes the temperature of the chamber is lower than the temperature at the bulb, charging the system with a temperature responsive volatile fluid, the maximum volume of liquid phase of the charge being less than the combined volumes of the chamber and tube, and preventing pumping of all the expandable fluid from the bulb when the temperature at the chamber is below the temperature at the bulb.

6. A method of using a bulb and a chamber interconnected by a capillary tube to effect changes in an element in the chamber in response to temperature variations at the bulb wherein the temperature at the chamber may be colder than the temperature at the bulb, the volume of the bulb being greater than the combined volumes of the chamber and tube, comprising the steps of charging the bulb, chamber and capillary tube with a mixture of volatile fluid and inert gas such that the maximum volume of liquid phase of the charge is less than the combined volumes of the chamber and tube, placing the bulb at a position where temperature variations are to be sensed, placing the chamber at a position where changes in its elements may be useful and where temperatures are sometimes lower than those at the bulb, and preventing pumping of all the volatile fluid from the bulb when the temperature at the chamber is lower than the temperature at the bulb.

References Cited by the Examiner

UNITED STATES PATENTS

| | | | |
|---|---|---|---|
| 1,081,139 | 12/1913 | Parliman | 73—375 |
| 1,513,979 | 11/1924 | Frey | 73—375 |
| 2,186,984 | 1/1940 | McCloy. | |
| 3,091,120 | 5/1963 | Kounovsky | 73—368.2 |

LOUIS R. PRINCE, *Primary Examiner.*

DAVID SCHONBERG, *Examiner.*

JAMES RENJILIAN, *Assistant Examiner.*